3,012,860
HYDROGEN PEROXIDE PURIFICATION
Robert E. Meeker and Daniel B. Luten, Jr., Berkeley, Calif., assignors to Shell Oil Company, a corporation of Delaware
No Drawing. Filed Mar. 17, 1958, Ser. No. 721,650
12 Claims. (Cl. 23—207)

This invention relates to the removal of organic impurities from hydrogen peroxide and deals with a new and advantageous method for carrying out such removal via oxidation.

A number of different methods have been suggested for purifying hydrogen peroxide containing organic impurities. Organic impurities more volatile than hydrogen peroxide can usually be efficiently removed by distillation without undue expense. Carboxylic acids are another type of organic impurity which can be removed readily by means of ion exchange resins, preferably anion exchange resins in bicarbonate form as described and claimed in copending application of Dunlop, Meeker and Pierotti, Serial No. 714,510, filed February 11, 1958. Other organic impurities and especially those boiling at a higher temperature than hydrogen peroxide, involve greater difficulty in removal without undue loss of peroxide. The method of Dunlop et al. claimed in U.S. Patent 2,695,217 employs conversion of the hydrogen peroxide to calcium peroxide as a means for eliminating organic impurities. The process of Pierotti et al. Patent U.S. 2,749,291 makes use of successive evaporations and condensations in combination with steam stripping and recycling operations for removing organic impurities from hydrogen peroxide.

It is an object of the present invention to provide a method for removing organic impurities from hydrogen peroxide by a controlled selective oxidation in which the impurities are converted to a more readily removable form by means of a portion of the peroxide. A special object is the oxidation of organic impurities in hydrogen peroxide to carboxylic acids without excessive loss of hydrogen peroxide through further oxidation of the acid or decomposition of the peroxide. Still another object is the economical removal of higher boiling organic impurities of the type encountered in hydrogen peroxide made by partial oxidation of organic intermediates. A particular object is the provision of a method of oxidizing organic impurities in hydrogen peroxide which is especially useful in conjunction with the process of hydrogen peroxide purification claimed in U.S. Patent 2,749,291 previously mentioned. Still further objects and advantages of the new method will be apparent from the following description of the invention.

The invention is based upon the discovery that by catalyzing the oxidation of organic impurities in hydrogen peroxide by a coordination complex of a polyvalent heavy metal ion with two different complexing agents, one of which is substantially replaceable by acetate ion and the other of which is not so replaceable, two adjacent coordination sites of the complex catalyst being occupied by the said substantially replaceable complexing agent, the desired reaction is promoted without promoting loss of hydrogen peroxide through decomposition and under the preferred conditions of operation decomposition is substantially completely avoided. This was quite unexpected since the heavy metals are well known to be very active catalysts of hydrogen peroxide decomposition. It would have been predicted therefore that any addition of any heavy metal compound of any kind to hydrogen peroxide would be undesirable. However, the special kind of heavy metal compounds indicated above are unique. They not only effectively catalyze the oxidation of organic impurities in hydrogen peroxide without promoting peroxide decomposition but also promote controlled oxidation of these impurities to carboxylic acids instead of further oxidation products so that only a very small consumption of peroxide is required for the process.

Without any intention of limiting the invention by any theory in explanation of the improvements which it provides, it may be pointed out that there appears to be a causal relationship between the structure of the coordination compounds used in the new process and their unique catalytic activity therein. The polyvalent heavy metals are recognized—see, for instance, "Stability Constants, Part I: Organic Ligands" by Bjerrum et al.—as forming coordination complexes in which there are up to six or more sites for attachment of the complexing agents. The complexing agents here under consideration are the so-called Lewis bases or compounds which tend to donate electrons. In the coordinate complexes used as catalysts in the process of the invention at least one of these sites must be occupied by a base which relatively difficult to replace with acetate ion, as previously mentioned. The presence of this difficultly removable base in the complex is believed to be responsible for the suppression of the peroxide decomposing activity of the polyvalent heavy metal used. There is evidence to support the view that the first step in the oxidation of organic impurities in hydrogen peroxide is formation of an organic peroxide. This oxidation, rather than the catalytic step, appears to be the rate-determining step at low pH. The peroxide is believed to be a hydroxy peroxide which attaches to two adjacent sites of the heavy metal coordinate complex by replacement of the complexing agent or agents which are substantially replaceable by acetate ions and which were attached to those sites in the starting catalyst. The strong attraction of the polyvalent heavy metal in the complex for electrons results in breakage of the peroxide group of the attached hydroxy peroxide with formation of carboxylic acid. The acid molecules thus produced are easily replaced in the complex by new molecules of hydroxy peroxide so the catalytic cycle continues.

The process of the invention thus comprises adding to aqueous hydrogen peroxide, containing organic compounds which it is desired to remove, a coordination complex of a polyvalent heavy metal containing two or more complexing agents having different replaceabilities by acetate ions, at least one of which is not substantially replaceable thereby while another of said complexing agents is substantially replaceable by acetate ions, there being at least two adjacent coordination sites occupied by the said more replaceable complexing agent and finally removing from the reaction mixture the carboxylic acid formed in the process.

The polyvalent heavy metals which are used in the coordinate complexes employed as catalyst in the new process include the recognized heavy metal oxidation catalysts, particularly the metals of the first transition series, namely vanadium, chromium, manganese, iron, cobalt, nickel, and copper, and other transition series metals such as molybdenum, rhodium, tungsten, platinum, mercury, and lead. Suitable compounds which can be used to introduce into the coordination complexes of these metals the necessary ligands which are not substantially replaceable by acetate ions are described in the previously-mentioned book of Bjerrum et al. Amines are one useful type of compound for preparing the coordination compounds employed as catalyst, especially those such as propylenediamine, ethylenediamine, diethylenetriamine, triethylenetetramine, hexamethylenetriamine, phenylenediamine, diaminocyclohexane, aminopyridine, dipyridyl, o-phenanthroline, and the like. The heterocyclic amines such as pyridine, beta-picoline and gamma-picoline, etc. are also useful.

Polycarboxylic acids such as oxalic, maleic, succinic, adipic, citric, tartaric, phthalic, terephthalic, and like acids are another suitable type of chelating agent for use in making catalysts for use in the process of the invention. Amino acids can likewise be used, picolinic, alpha-aminopropionic, anthranilic, asparaginic, glutamic, hippuric and quinolic acids, for instance, being suitable examples. The hydroxy acids such as salicylic, for example, are suitable.

An especially advantageous class of compounds which have been successfully used in making heavy metal coordinate compounds which are useful catalysts are the ion exchange resins. These may be cation exchange resins of the carboxylic acid or of the sulfonic acid type or may be those containing both types of acid groups or may be of the phosphonic acid type. Specific cation exchange resins which have been found to be useful are, for instance, the sulfonic acid type resins exemplified by the sulfonated phenolaldehyde condensation resins such as the phenolic methylene sulfonic resins sold by Rohm and Haas Company under the trade name Amberlite IR–100, Amberlite IR–120 and IR–105, the phenolic methylene sulfonic resin supplied by American Cyanamid Company under the trade name Ionac C–200, and the phenolic methylene sulfonic resins; the carboxylic acid type resins such as the salicylic acid-formaldehyde condensation products typical of which are the cation exchange resins disclosed in U.S. Patent 2,471,818, etc. Sulfonated cross-linked polymers of polyvinyl aryl compounds such as divinyl benzene or of mixtures of such polyvinyl aryl compounds with monovinyl aryl compounds such as styrene are especially useful in making the coordination compound catalysts for the present process because of their resistance to attack by hydrogen peroxide. Resins of this type are described in U.S. Patent 2,366,007, for instance, and are sold by Dow Chemical Company as "Dowex 50." A typical phosphonic acid resin is Duolite C–63, manufactured by the Chemical Process Company. The ion exchange resin may also be an anion exchanger of the weak base type such as Dowex 3, containing free amine functional groups which can hold the heavy metal catalyst ion by forming complex metal-amine bonds.

Suitable complexing agents substantially replaceable by acetate ion include, for example, $H_2O$, $OH^-$, $Br^-$, $Cl^-$, $F^-$, $SO_4^=$, $NO_3^-$, $NO_2^-$, $SCN^-$, $CH_3COO^-$, $HCOO^-$ and the like. Two adjacent sites on the heavy metal ion may be occupied by two of the same or by different substantially replaceable complexing agents. It is not always necessary that the catalyst have the replaceable complexing agents initially on adjacent sites. For example

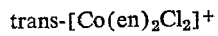
trans-$[Co(en)_2Cl_2]^+$ is a suitable catalyst because in solution it isomerizes to cis-$[Co(en)_2Cl_2]^+$ and hydrolyses to

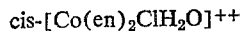
cis-$[Co(en)_2ClH_2O]^{++}$ and to cis-$[Co(en)_2(H_2O)_2]^{+3}$, where the cis-isomers have the chloro or aquo groups in the desired adjacent sites on cobalt.

While all the coordination compounds of the polyvalent heavy metals of the previously indicated characteristics are useful catalysts in the process, all are not equivalent catalyst. Thus it has been found that those made with chromium and/or cobalt and/or copper as the heavy metal are outstandingly superior to the coordinate compounds of the other suitable heavy metals. The compounds made with nickel are excellent but give slower oxidation rates than the corresponding cobalt complexes. The corresponding complexes of iron, for instance, are generally inferior to those of cobalt because of higher decomposition losses of hydrogen peroxide. In general, the most advantageous catalysts, all things considered, are the coordinate complexes of cobalt with cation exchange resins of the sulfonic acid type especially those from sulfonated aromatic hydrocarbon resins.

When using polybasic acids in making the coordinate complex catalysts, it has been found desirable to neutralize any free acid groups remaining in the complex with cations more easily displaced than the polyvalent metal catalyst in the complex. This is especially the case when using cation exchange resins in making the catalysts since the polyvalent metal is seldom able to react with all the acid groups because of steric factors. Cations suitable for this purpose must be inert toward hydrogen peroxide decomposition. Cations which normally exist in solution in only one valence state have been found useful, especially those of the alkali and alkaline earth metals, ammonia and the like. Catalysts of this preferred type can be readily prepared, for example, by contacting the selected cation exchange resin in the form of its alkali metal or ammonium or alkaline earth metal salt, say the sodium salt form, with an aqueous solution of a salt of the polyvalent heavy metal which has been chosen, for instance, cobalt nitrate. The treatment is continued until the replacement of sodium by cobalt has reached the desired extent, advantageously until the resin is between about 0.1 and about 75% saturated with the chosen polyvalent metal capable of existing in more than one valence state. This catalyst can be used directly in the process of the invention.

The process of the invention is advantageously carried out at a temperature of the order of about 10 to about 80° C. Operation at about room temperature has the advantage of economy and seems to promote longer effective catalyst life when using coordinate complexes of cation exchange resins apparently by reducing any attack on the resin by the hydrogen peroxide. Higher temperatures on the other hand promote the desired oxidation and thus reduce the required reaction time and increase plant capacity. Ordinarily a reaction time of the order of about 7 hours at low pH is sufficient to reduce the organic peroxide to about 50%, at or before which point it is desirable to remove the carboxylic acid formed, as will be explained more fully hereinafter.

It has been found that the desired oxidation can be accomplished in much shorter time by maintaining a pH of about 5.5 to 7 in the reaction mixture. This requires addition of base, preferably an inorganic base such as alkali metal or alkaline earth metal hydroxide, oxide, bicarbonate, ammonia, or the like, sodium hydroxide or lime being particularly suitable because of their cheapness. Operation in this pH range results in two advantages, namely, acceleration of the initial oxidation to the organic peroxide intermediate by hydroxyl ions and promotion of complex formation between the catalyst and the organic peroxide so formed. A pH substantially above 7 which would otherwise be desirable for promoting this non-catalytic step in the oxidation should preferably not be used because of the tendency toward hydrogen peroxide decomposition under alkaline conditions. By operating in the pH range of about 5.5 to 7 the time for 50% reaction can be reduced from about 7 hours at 60° C. to about 10 to 30 minutes at 25° C.

As used here, pH means the pH reading obtained in the usual way with a pH meter and glass-calomel electrodes. In dilute aqueous hydrogen peroxide solutions, this pH reading does not differ substantially from the "true aqueous pH." For peroxide concentrations of about 30% wt or higher, the difference becomes appreciable, and corrections must be applied, as described by J. R. Kolczynski et al. in the Journal of the American Chemical Society, vol. 79, page 531 (1957).

As previously indicated the carboxylic acid formed in the oxidation according to the invention is removed from the reaction mixture to obtain the desired hydrogen peroxide of lower organic impurity content. The removal of the carboxylic acid can be carried out in any suitable way. For instance, any of the known methods of removing organic acids from hydrogen peroxide can be employed. Thus steam stripping can be used as, for example, in the method of Pierotti et al. patent, U.S.

2,749,291. It is a special feature of the present invention in one of its more advantageous modifications, that the carboxylic acid obtained in the process is removed by means of anion exchange resin. For this purpose, it is desirable to use an anion exchange resin which is resistant to attack by the hydrogen peroxide solution under the conditions used for the purification. It is desirable to employ a strong base resin of the quaternary ammonium salt type as distinguished from the weak base resins (primary, secondary and tertiary amine type resins) normally used for removing unionized acids from aqueous solutions because carboxylic acid removal is more complete with strong base resin and because weak base resins give too high a pH for peroxide stability. Examples of strong base resins which are advantageously used in the process are the products of amination with trimethyl amine, for instance, of a chloromethylated styrene-divinyl benzene copolymer as described in U.S. 2,591,573 and sold by Rohm and Haas under the trade names "Amberlite IRA-400" and "Amberlite IRA-401"; anion exchange resins made by the process of U.S. 2,388,235 and the resins sold by Dow Chemical Company under the trade names "Dowex 1," "Dowex 2," and "Dowex 21K" or by National Aluminate Corporation under the trade name "Nalcit SBR" or the like. "Duolite A42, A101 and A102, made by Chemical Process Company, Redwood City, California, are other anion exchange resins suitable for use in the new process. The strong base resins are preferably used in the form of their salts rather than in the free base form, especially when they are employed in admixture with the heavy metal coordinate complex catalyst as in a preferred modification of the new process. In this way one avoids the high pH which these resins would otherwise cause and which tends to promote undesirable hydrogen peroxide decomposition, particularly when heavy metals are present. Use of the basic resins in the form of their inorganic salts is usually most advantageous. The fluoride form is especially efficient for removal of the carboxylic acid but renders the hydrogen peroxide solutions corrosive. There are advantages in using anion exchange resin salts which introduce anions useful in the stabilization of hydrogen peroxide. In this category are, for example, the nitrate salts or more suitably the phosphate or better yet the pyrophosphate salts. The mono- and/or disodium phosphate salts of "Dowex 1" anion exchange resin, for instance, are especially useful in that the sodium acid phosphate introduced into the $H_2O_2$ by exchange reaction also helps to buffer the peroxide solution at a pH in the desired range of about 5.5 to about 7, without the necessity of adding a full equivalent of caustic. Other inorganic salts of anion exchange resins which can also be used include the carbonate or bicarbonate, etc.

The new process can be carried out in a number of different ways using batch, intermittent or continuous methods of reaction. One simple method of batch reaction, for instance, comprises contacting the aqueous hydrogen peroxide to be purified with the chosen heavy metal coordinate complex being employed as catalyst for the required length of time, most preferably while adding a base, e.g., $N_aOH$, to maintain the mixture at optimum pH as previously indicated, and then separating the carboxylic acid formed by one of the methods previously described. In this modification of the process, when using catalysts which are solids insoluble in the peroxide solution, the contact of catalyst and solution is usually affected by stirring a slurry of catalyst and solution in a reaction vessel or tank or by pumping this slurry through a coil or a tank provided with baffles or other means to promote intimate contact at a rate sufficient to keep the catalyst uniformly suspended. Alternatively, the hydrogen peroxide solution to be purified can be passed through a stationary bed of solid, insoluble heavy metal coordinate complex catalyst, this being an especially advantageous method of employing the catalysts made with a cation exchange resin as the coordinating compound.

To minimize hydrogen peroxide decomposition losses, it is advantageous, as previously pointed out, to remove the acid formed in the reaction before too great an amount has accumulated in the reaction mixture and more advantageously before the oxidation of the organic impurities is 50% complete and most advantageously before it has reached 10% of completion. It is particularly desirable to remove the acid before the amount present exceeds 0.005 mole per liter of solution. One can, for example, carry out the process continuously in a series of steps in which the hydrogen peroxide to be purified is fed to a first reaction stage in which it is contacted with a slurry of heavy metal coordination complex catalyst, from which it is separated after the desired partial conversion of the organic impurities to carboxylic acid has been completed. The peroxide solution is then passed through a bed of anion exchange resin to remove the carboxylic acid and thereafter fed to a second reaction stage like the first, where it is again contacted with heavy metal coordination complex of the character previously described. After the second reaction stage the hydrogen peroxide solution is again passed through a bed of anion exchange resin. Usually two stages of reaction in this way are sufficient to reduce the organic impurities to permissible levels but three or more stages each with an associated anion exchange resin bed for removing the carboxylic acids formed are sometimes desirable in this modification of the invention. The method of acid removal with a strong base anion exchange resin in bicarbonate form described and claimed in Dunlop, Meeker and Pierotti application Serial No. 714,510, filed February 11, 1958, previously referred to is especially advantageous in this modification of the invention, particularly when carried out by dispersing the peroxide solution over the bed of anion exchange resin in bicarbonate form by means of an inert gas, preferably a gas containing carbon dioxide sufficient to maintain the pH below about 6.5.

Another especially useful modification of the new process makes use of a reaction tank in which the uncatalyzed initial stage of the reaction is permitted to take place with formation of organic peroxide as previously discussed, after which the hydrogen peroxide solution is contacted with a mixture of heavy metal coordination complex oxidation catalyst and anion exchange resin to remove the carboxylic acid produced substantially as fast as it is formed. Indeed, the use of these mixtures of coordination complex catalyst, especially complexes of heavy metal with cation exchange resins, and anion exchange resin are exceptionally useful whether or not the separate non-catalytic oxidation step is employed. Most advantageously these mixtures of catalytic heavy metal on cation exchange resin with anion exchange resin are used in the form of stationary bed through which the peroxide solution is passed either upflow or downward. When using a bed of this type in combination with the non-catalytic oxidation step previously mentioned, a convenient mode of operation is as follows. The hydrogen peroxide solution to be purified, with added base for pH control, is fed to a stream of hydrogen peroxide solution flowing from the non-catalytic reactor to the bed of mixed catalyst and anion exchange resin. After passage through this bed a portion of the solution corresponding in volume to the crude feed is withdrawn as purified product while the remainder is returned to the non-catalytic reactor for reaction as previously indicated. Still other methods of applying the principles of the invention can be employed.

The catalysts used in the process of the invention have a long life and generally require no reactivation. However, under certain circumstances they may tend lose a portion of their catalytic polyvalent heavy metal content after extended periods of use. In such cases this metal content can be replaced by the procedure used initially in making up the catalyst as previously described. The anion resin used in one of the preferred embodiments of the invention for removal of the carboxylic acid or acids formed in the oxidation will usually require regeneration at periodic intervals. The conventional methods of regeneration are usually satisfactory.

The following examples further illustrate the new method of the invention and show some of its advantages:

Example I

Dichlorotetrapyridinecobalt (III) chloride, [Co(pyridine)$_4$Cl$_2$]Cl, was used as the catalyst for the oxidation of organic impurities in aqueous hydrogen peroxide of 16% wt. concentration containing about 0.4% wt. carbon in organic impurities, of which the chief component was formaldehyde. This cobalt complex was added to crude hydrogen peroxide solution in an amount of 0.06% wt. and the mixture stirred at 50° C. for 4 hours, after which analysis of the products showed 25% oxidation of the organic impurities and 2.2% loss of the hydrogen peroxide. After heating for one more hour, analysis showed 33% oxidation of the organic impurities and 7.1% loss of the peroxide.

Good purification is obtained by using in the same way the following heavy metal complexes as the oxidation catalyst instead of the cobalt complex employed in the foregoing test:

[Co(ethylenediamine)$_2$Cl$_2$]NO$_3$
[Co(ethylenediamine)ClH$_2$O]SO$_4$
[Co(ethylenediamine)$_2$(H$_2$O)$_2$](NO$_3$)$_3$
[Co(propylenediamine)$_2$(H$_2$O)$_2$]Cl$_3$
[Co(dipyridyl)$_2$(H$_2$O)$_2$](NO$_3$)$_3$
[Co(triethylenetetramine)(H$_2$O)$_2$]PO$_4$
[Co(diethylenetriamine)(H$_2$O)$_3$](NO$_3$)$_3$
[Co(oxalate)$_2$(H$_2$O)$_2$](NO$_3$)$_3$
[Co(picolinate)$_2$(H$_2$O)$_2$](NO$_3$)$_3$
[Cr(ethylenediamine)$_2$(H$_2$O)$_2$](NO$_3$)$_3$
K[Cr(oxalate)$_2$(H$_2$O)$_2$]
[Cu(salicylate)(H$_2$O)$_2$]
[Ni(ethylenediamine)$_2$(H$_2$O)$_2$](NO$_3$)$_2$

Example II

A cobalt complex prepared from a sulfonated polystyrene type cation exchange resin sold by Dow Chemical Company under the trade name "Dowex 50" was used to purify aqueous hydrogen peroxide of 30% wt. concentration containing 0.3% wt. formaldehyde as impurity. Using 3% wt. of the Dowex 50 about 2% saturated with cobalt applied as a 0.2% aqueous solution of cobalt nitrate, at 60° C. and a contact time of 5 hours, the oxidation to formic acid was 40% complete while loss of hydrogen peroxide was only 3.3%.

When the formic acid produced is removed from the oxidation product by passing the mixture through a bed of Dowex 1 anion exchange resin (a trimethyl benzyl ammonium poly(styrene-divinylbenzene) resin) which has been converted to the bicarbonate salt form by treatment with a 5% solution of sodium bicarbonate, employing a concurrent stream of air containing about 5% of carbon dioxide to distribute the liquid as a downflowing film over the resin, and the oxidation and formic acid removal steps are repeated, the removal of formaldehyde impurity is increased to over 60% while the hydrogen peroxide loss remains low.

Example III

Using a chromium complex prepared by treating Dowex 50 with an aqueous solution of chromic chloride so that the resin was about 1% saturated with chromium, formaldehyde removal from the hydrogen peroxide under the conditions of Example II was 25% while the hydrogen peroxide loss was 2.7%.

With the corresponding complex of copper and Dowex 50, the impurity removal was 20% while the hydrogen peroxide loss was 1.6%.

When using the corresponding nickel complex the reaction was slower but the selectivity was good, there being no detectable hydrogen peroxide loss.

Equally good results are obtained when using mixtures of polyvalent heavy metals in the resin, for instance, cobalt and chromium together on Dowex 50. Other complex catalysts which can be used under the same conditions are complexes of about 1% manganese and vanadium, respectively, on Dowex 50.

Example IV

The advantageous acceleration of the oxidation of organic impurities in hydrogen peroxide obtained by maintaining a higher pH in the reaction mixture by adding alkali during the reaction is shown by the following results.

A crude hydrogen peroxide solution of 20% wt. concentration containing 0.2% wt. formaldehyde, was purified by treatment in a stirred tank reactor with a catalyst consisting of cobalt on Dowex 50 cation exchange resin prepared as in Example II. The pH was maintained at approximately 6.5 by adding sodium hydroxide, and the product formate ion was removed with the fluoride form of Duolite A-102, an anion exchange resin manufactured by the Chemical Process Company. The average time of contact of catalyst, anion resin and peroxide was 10 minutes at 25° C. The oxidation of formaldehyde was 55% complete with no detectable loss in peroxide.

A similar advantageous acceleration of the oxidation is obtained by using a pH above 5 when employing the cobalt-pyridine-chloride complex of Example I as the catalyst.

Example V

Regeneration of exhausted anion resin was demonstrated in a series of experiments when using a mixture of cobalt on Dowex 50 cation exchange resin as the oxidation catalyst with Duolite A-102 anion exchange resin in fluoride salt form for removal of the carboxylic acid produced. The oxidations were carried out batchwise at about 25° C. with 20% wt. hydrogen peroxide containing 0.2% wt. formaldehyde maintained at pH about 6.5 with added sodium hydroxide, using an average time of contact of resin and peroxide solution of about 10 minutes, at which oxidation of the formaldehyde was 55% with no loss of hydrogen peroxide detectable. At the end of a batch experiment, the resins were filtered off, transferred to a column, and separated in the usual manner by a water backwash. The separated anion resin was regenerated with a saturated sodium fluoride solution. The regenerated anion resin was then remixed with the catalyst resin and used to treat a new batch of hydrogen peroxide. After ten such cycles of oxidation and regeneration, the resins showed no obvious harmful effects.

Example VI

An experiment similar to that described in Example V using copper ion on Dowex 50 as catalyst and the fluoride form of Dowex 1 to remove the product acid gave the following results at pH 6.5.

| Reaction Time, minutes | Percent Oxidation of Formaldehyde | Percent Loss in H$_2$O$_2$ |
|---|---|---|
| 8 | 35 | 6.6 |
| 34 | 80 | 11.0 |

In a similar experiment using the bicarbonate form of Dowex 1 to remove the acids, and the cobalt-sodium form of Dowex 50 as oxidation catalyst, 35% of the formaldehyde was oxidized in 7 minutes at 25° C., with a peroxide loss of 1.6%.

Example VII

Fixed bed operation of the process of the invention was demonstrated by passing an impure solution containing 15% wt. H₂O₂ and 0.1% wt. formaldehyde over a mixed bed containing one part of catalyst resin, Dowex 50 with cobalt, and seven parts by weight of anion resin, Dowex 1 in the fluoride form, in circuit with a separate stirred tank where the pH of the peroxide solution was maintained at about 6.5 by the addition of NaOH solution. The nominal residence time in the tank was about four times that in the catalyst bed. After circulating the peroxide solution for 84 minutes at room temperature, 82% of the formaldehyde was oxidized and only 2% of the peroxide was lost.

In a similar experiment using a crude hydrogen peroxide solution obtained by liquid phase oxidation of isopropyl alcohol and containing 12% wt. H₂O₂ and 0.15% wt. carbon in organic impurities of low volatility, 81% of the organic impurities was oxidized in 77 minutes at room temperature with a 9.6% loss of hydrogen peroxide.

*Example VIII*

The advantage in having the non-cobaltic sites on the catalyst resin occupied by cations of light metals or ammonium or the like instead of hydrogen ions is shown by the results of two experiments described below. The crude solution to be purified contained 30% wt. H₂O₂ and 0.8% wt. carbon in organic impurities of low volatility and was obtained by liquid phase oxidation of isopropyl alcohol with molecular oxygen followed by distilling off the unreacted alcohol as azeotrope with water together with the acetone formed as by-product in the reaction.

Both experiments were conducted as in Example VII at pH 6.0 with a fixed bed containing a mixture of one part catalyst resin and ten parts by volume of anion resin, Dowex 1 in the HPO₄⁼ form. In one instance the cobalt complex catalyst was prepared by treating the Dowex 50 resin in the hydrogen form in a slurry with the calculated amount of cobalt nitrate solution, followed by water washing, so that all sites not occupied by cobalt remained in the hydrogen form. Similarly the other catalyst was prepared by converting Dowex 50 resin to the sodium form in a column with sodium hydroxide solution, washing with water, and then contacting in a slurry with cobalt nitrate solution so that the same cobalt content as in the first catalyst was obtained by replacement of sodium by cobalt.

The two catalysts were used separately at 30° C. with the following results:

| Catalyst | Reaction Time, minutes | Impurity Removal, percent | H₂O₂ Loss, percent |
|---|---|---|---|
| Cobalt complex with Dowex 50 in hydrogen form | 90 | 1 | 3.7 |
| Cobalt complex with Dowex 50 in sodium form | 30 | 45 | 1.3 |

We claim as our invention:

1. A process for purifying aqueous hydrogen peroxide containing organic impurities which comprises contacting the aqueous peroxide solution with a coordination complex of a heavy metal of the group consisting of vanadium, chromium, manganese, iron, cobalt, nickel, copper, molybdenum, rhodium, tungsten, platinum, mercury and lead in which at least one of the coordination sites of the heavy metal is taken up by a member of the group consisting of polyamines, polycarboxylic acids, aminocarboxylic acids, cation exchange resins having sulfonic acid groups, cation exchange resins having carboxylic acid groups and cation exchange resins having phosphonic acid groups and at least two adjacent coordination sites on the heavy metal are occupied by complexing agent for said heavy metal which complexing agent is Lewis base substantially replaceable from said metal by acetate ion and removing from the hydrogen peroxide the carboxylic acid which is thereby produced from the organic impurities.

2. A process in accordance with claim 1 in which the carboxylic acid produced is removed by means of a strongly basic quaternary amine anion exchange resin in salt form.

3. A process in accordance with claim 1 in which the pH of the hydrogen peroxide is maintained in the range of about 5.5 to 7 and the temperature is between about 10° and about 100° C. during said contacting.

4. A process for purifying aqueous hydrogen peroxide containing organic impurities which comprises contacting the aqueous peroxide solution with a coordination complex of a heavy metal of the group consisting of vanadium, chromium, manganese, iron, cobalt, nickel, copper, molybdenum, rhodium, tungsten, platinum, mercury and lead in which at least one of the coordination sites of the heavy metal is taken up by a member of the group consisting of polyamines, polycarboxylic acids, aminocarboxylic acids, cation exchange resins having sulfonic acid groups, cation exchange resins having carboxylic acid groups and cation exchange resins having phosphonic acid groups and at least two adjacent coordination sites on the heavy metal are occupied by members selected from the group consisting of hydroxyl, bromo, chloro, fluoro, sulfate, nitrate, nitrite, thiocyanate, acetate and formate groups and water and removing the carboxylic acid which is produced.

5. A process for removing organic impurities from an aqueous solution of hydrogen peroxide which comprises intimately contacting said hydrogen peroxide solution with a coordination complex of cobalt and pyridine soluble in the peroxide, which complex has at least two adjacent sites on the cobalt occupied by a complexing agent which is a Lewis base substantially replaceable by acetate ion and removing the resulting carboxylic acid.

6. A process for removing organic impurities from an aqueous solution of hydrogen peroxide which comprises intimately contacting said hydrogen peroxide solution with a coordination complex of cobalt and a cation exchange resin having sulfonic acid groups wherein at least two adjacent coordination sites of the cobalt are occupied by a complexing agent which is a Lewis base substantially replaceable by acetate ion and removing from the hydrogen peroxide the carboxylic acid which is thereby produced from the organic impurities.

7. A process in accordance with claim 6 wherein the resin is between about 0.1 and about 75 percent saturated with cobalt and the acid groups of the resin not taken up by the cobalt are neutralized by cations of the group consisting of alkali, alkaline earth and ammonium cations.

8. A process for purifying an aqueous solution of hydrogen peroxide containing organic impurities which comprises passing said peroxide solution through a bed comprising a mixture of strongly basic quaternary amine anion exchange resin in salt form and cation exchange resin having sulfonic acid groups and having cobalt ions adsorbed thereon to form a coordination complex wherein at least two adjacent coordination sites on the cobalt are taken up by a Lewis base which is substantially replaceable from the cobalt by acetate ion and removing from the hydrogen peroxide the carboxylic acid which is thereby produced from the organic impurities.

9. A process in accordance with claim 8 wherein inorganic base is added to the hydrogen peroxide in an amount sufficient to maintain the pH between about 5.5 and 7 during passage of the peroxide through said bed.

10. A process in accordance with claim 9 wherein a portion of the hydrogen peroxide from said bed is recirculated thereto together with added impure hydrogen peroxide after a reaction period out of contact with said bed of about 1 to about 10 minutes at about 10 to about 100° C.

11. A process for purifying hydrogen peroxide containing organic impurities which comprises contacting an aqueous solution of said peroxide with a cation exchange resin containing carboxylic acid groups as exchange groups and having cobalt adsorbed thereon, the acid groups not taken up by cobalt being neutralized by cations of the group consisting of alkali, alkaline earth and ammonium cations and there being at least two adjacent coordination sites on the cobalt taken up by a complexing agent which is a Lewis base substantially replaceable by acetate ion and removing from the hydrogen peroxide the carboxylic acid which is thereby produced from the organic impurities.

12. A process for purifying hydrogen peroxide containing organic impurities which comprises contacting an aqueous solution of said peroxide with a cation exchange resin containing sulfonic acid groups as exchange groups and having chromium adsorbed thereon, the acid groups not taken up by chromium being neutralized by cations of the group consisting of alkali, alkaline earth and ammonium cations and there being at least two adjacent coordination sites on the chromium taken up by a complexing agent which is a Lewis base substantially replaceable by acetate ion and removing from the hydrogen peroxide the carboxylic acid which is thereby produced from the organic impurities.

References Cited in the file of this patent

UNITED STATES PATENTS

| | | |
|---|---|---|
| 1,256,032 | Mittasch | Feb. 12, 1918 |
| 2,461,988 | Kooijman | Feb. 15, 1949 |
| 2,485,485 | Dudley | Oct. 18, 1949 |

OTHER REFERENCES

Arthur V. Tobolosky et al., "Organic Peroxides," published by Interscience Publishers, Inc., N.Y. (1954), p. 103.